(12) United States Patent
Miller et al.

(10) Patent No.: US 9,831,754 B2
(45) Date of Patent: Nov. 28, 2017

(54) MINIATURE MECHANICAL SHUTTER

(71) Applicant: THE REGENTS OF THE UNIVERSITY OF MICHIGAN, Ann Arbor, MI (US)

(72) Inventors: Stephanie A. Miller, Ann Arbor, MI (US); David A. Anderson, Ann Arbor, MI (US); Andrew T. Cadotte, Ann Arbor, MI (US); Georg A. Raithel, Ann Arbor, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 447 days.

(21) Appl. No.: 14/645,555

(22) Filed: Mar. 12, 2015

(65) Prior Publication Data

US 2015/0263595 A1    Sep. 17, 2015

Related U.S. Application Data

(60) Provisional application No. 61/952,278, filed on Mar. 13, 2014.

(51) Int. Cl.
| | | |
|---|---|---|
| *H02K 33/00* | (2006.01) | |
| *H02K 37/00* | (2006.01) | |
| *H02K 7/00* | (2006.01) | |
| *H02K 33/16* | (2006.01) | |
| *G21K 1/04* | (2006.01) | |

(52) U.S. Cl.
CPC ............ *H02K 33/16* (2013.01); *G21K 1/043* (2013.01)

(58) Field of Classification Search
CPC .................................. H02K 33/00; H02K 7/00
USPC ........ 310/12.31, 15, 36, 46, 49.32, 80, 90.5, 310/156.11
See application file for complete search history.

(56) References Cited

U.S. PATENT DOCUMENTS

| | | | | |
|---|---|---|---|---|
| 5,820,104 A | * | 10/1998 | Koyano | .................. F16K 51/02 251/129.15 |
| 7,276,124 B2 | | 10/2007 | Gurary et al. | |
| 2004/0211422 A1 | * | 10/2004 | Arcilla | .................. A61M 16/20 128/204.19 |

OTHER PUBLICATIONS

Miller, S., Anderson, D., Cadotte, A., Raithel, G., "A miniature mechanical shutter for atomic beams," American Physical Society, 43rd Annual Meeting of the APS Division of Atomic, Molecular and Optical Physics, Jun. 4-8, 2012, Abstract, 1 page.

(Continued)

*Primary Examiner* — Jose Gonzalez Quinones
(74) *Attorney, Agent, or Firm* — Harness, Dickey & Pierce, P.L.C.

(57) ABSTRACT

A miniature mechanical shutter having a chamber, a shutter member having an aperture formed therethrough that is mounted to the chamber to allow translation and rotation about an axis. A pair of cap members are disposed on opposing ends of the shutter member to support the shutter member during the translation and rotation. The shutter further comprising a plurality of magnet members, such that a first of the plurality of magnet members is disposed in a first end of the shutter member, a second of the plurality of magnet members is disposed in a second end of the shutter member opposite the first end, and a third of the plurality of magnets members is disposed external to the chamber. At least one of the plurality of magnet members is responsive to an electrical impulse to translate and/or rotate the shutter member between an opened position and a closed position.

12 Claims, 2 Drawing Sheets

(56) References Cited

OTHER PUBLICATIONS

Figure 1:
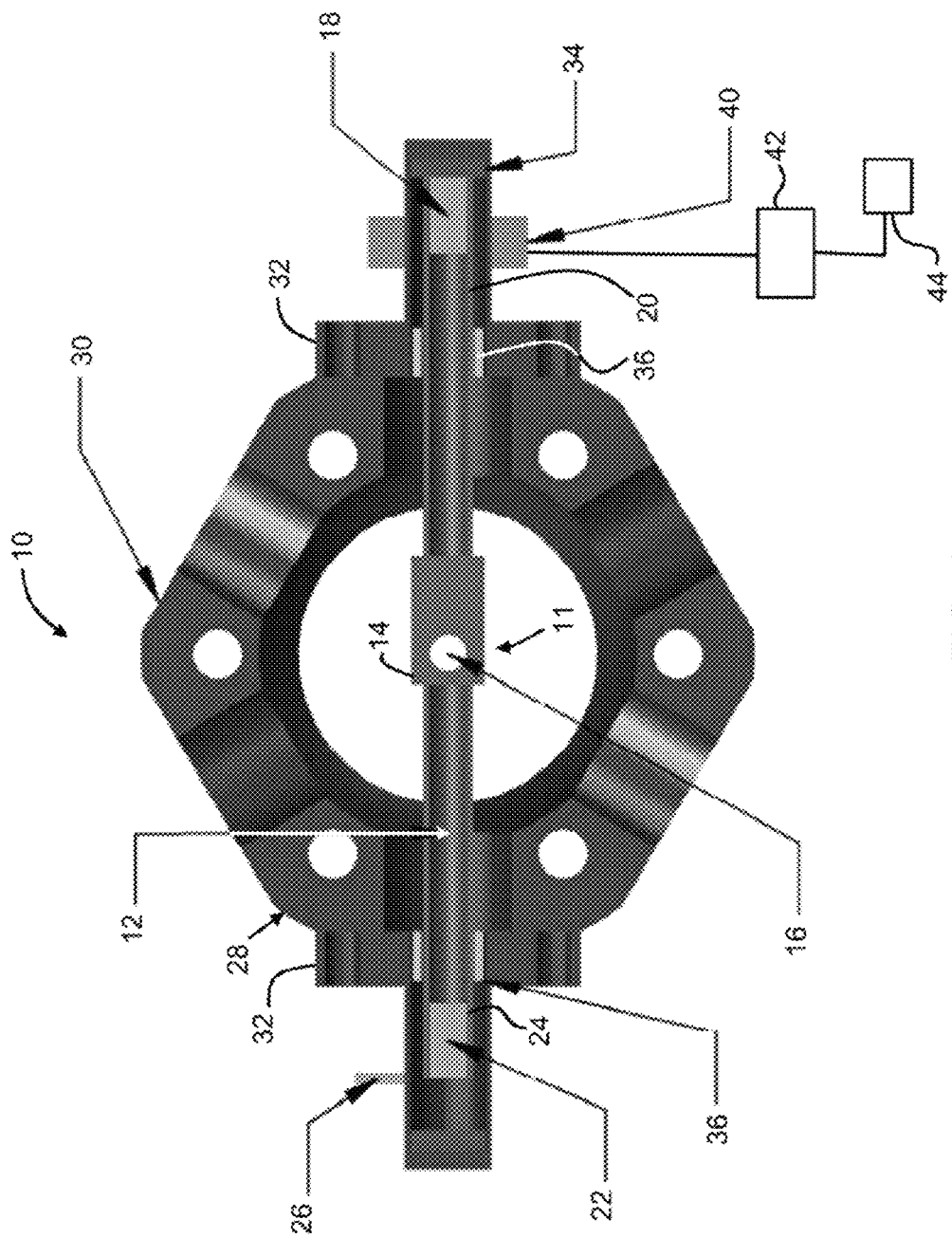

Miller, S., Anderson, D., Cadotte, A., Raithel, G., "A miniature mechanical shutter for atomic beams," American Physical Society, 43rd Annual Meeting of the APS Division of Atomic, Molecular and Optical Physics, Jun. 4-8, 2012, Poster, 1 page.

* cited by examiner

MINIATURE MECHANICAL SHUTTER

CROSS-REFERENCE TO RELATED APPLICATIONS

This application claims the benefit of U.S. Provisional Application No. 61/952,278, filed on Mar. 13, 2014. The entire disclosure of the above application is incorporated herein by reference.

GOVERNMENT INTEREST

This invention was made with government support under FA9550-10-1-0453 awarded by the United States Air Force/AFOSR. The Government has certain rights in the invention.

FIELD

The present disclosure relates to a miniature mechanical shutter assembly for use in, for example, ultra-high vacuum (UHV) scientific experiments.

BACKGROUND AND SUMMARY

This section provides background information related to the present disclosure which is not necessarily prior art. This section provides a general summary of the disclosure, and is not a comprehensive disclosure of its full scope or all of its features.

A miniature mechanical shutter for use in ultra-high vacuum (UHV) scientific experiments is provided. In many contemporary atomic physics experiments, including the production of Bose-Einstein condensates (as is our intended use), it is necessary to temporarily block a beam of hot atoms from the experimental region. Since the entire experiment takes place in a vacuum chamber, a shutter made from vacuum compatible parts is needed. Additionally, the shutter needs to be fast (on the order of a few milliseconds or less) in order to fit into typical experimental time sequences. Mechanical shutters currently available on the market are for use external to the vacuum chamber, are large and bulky, are slow or manual, or are costly.

The device provided here is entirely controlled by low-voltage electronics, fits into a space less than 2"×2"×5", has a travel time (time from completely open to completely closed, or vice versa) of about 2 milliseconds, has a simple mechanical design, and is made of inexpensive materials. Commercially available shutters have limited size options. The shutter presented here has components that are all adaptable and can be customized for any system.

Although it can be used to block a beam of atoms, the device of the present teachings is also advantageous in connection with blocking optical beams inside a vacuum, in cases when an external shutter cannot be used.

According to the principles of the present teachings, a shutter system is provided having a stainless steel tube with a flattened middle section that has a hole in it. The housing of the shutter has two caps constructed from standard vacuum compatible components. In each cap, there is a Teflon disk that serves as a soft stop for the shutter's motion, as well as a section of glass tubing that serves as a minimal friction track on which the shutter operates. Three neodymium magnets (one in each end of the steel tube, and one external to the housing) control the rotational and axial motion of the shutter. The other components that control the axial movement of the shutter are external to the chamber. A pulse of current through a solenoid (a coil of wire) creates a magnetic field that displaces one of the magnets, causing the shutter to open or close, depending on the direction of the current. The current pulses are controlled by a H-bridge circuit in conjunction with a TTL pulse generator, both of which are external to the chamber as well. The shutter operates with current pulses at 8 volts and 5 amperes, with pulse durations of about 50 milliseconds (ms). The shutter action occurs 10 to 15 ms after pulse is initiated, and the total time of movement of the shutter is about 2 ms. For our application, the shutter will cycle once every 10 to 60 seconds, resulting in negligible heating of the solenoid. The adjustable parameters of the constructed device are the location of the solenoid in relation to the magnet, the current, the voltage, and the pulse duration. The parameters are optimized for best performance.

The device was tested both in atmosphere and vacuum, and two attributes were tested: maintenance-free operating period and failure rate. For the first, the shutter was tested in continual cycles for a few days to ensure that the parts did not fail, nor that the shutter got stuck. To find the failure rate, over 3000 periods were sampled, and each individual pulse was examined for failures (i.e., cases of partial or no movement). No failures were found for either test.

The shutter has two recovery options in case it does get stuck. First, applying a long, high current pulse would free the shutter. An alternative method is to bring another magnet close to the axial magnet to free the shutter. If the shutter needs to be disabled for experiments that do not require it, an additional magnet can be fixed to the outside of the cap to lock the shutter in either the open or closed position.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 2:
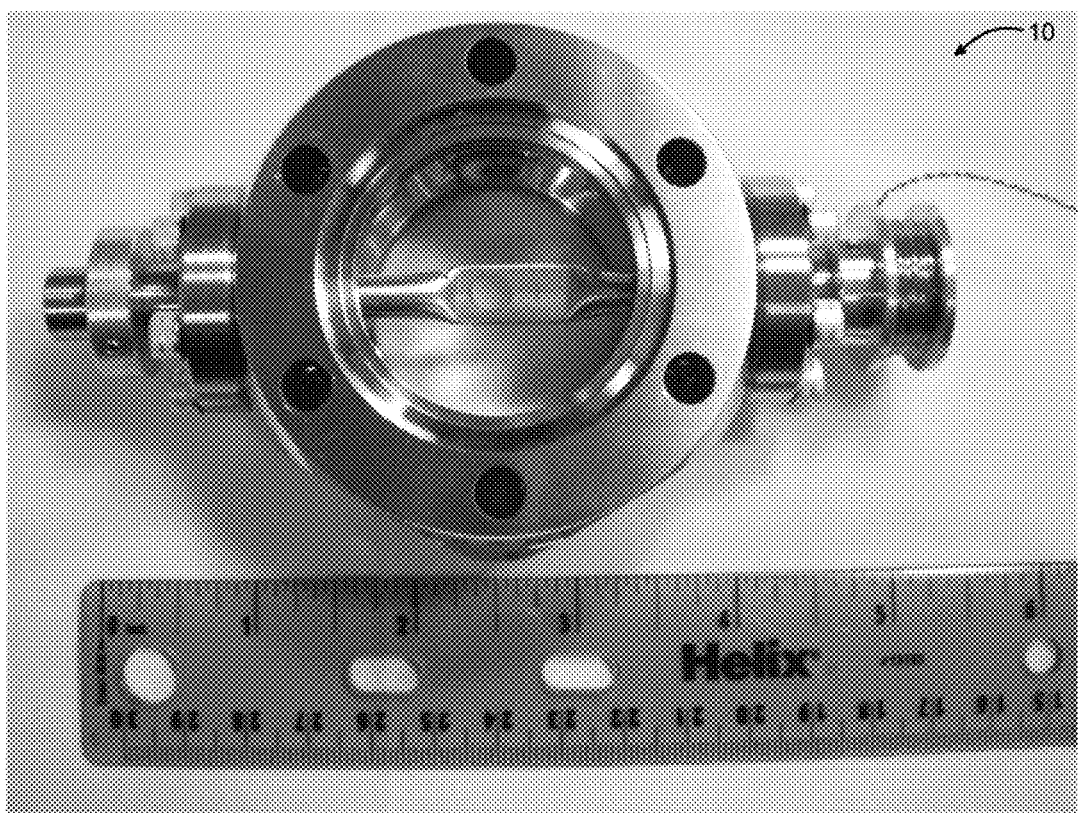

FIG. 1 is a cross-sectional view illustrating a miniature mechanical shutter according to the principles of the present teachings; and FIG. 2 is a photograph of the miniature mechanical shutter according to the principles of the present teachings.

Corresponding reference numerals indicate corresponding parts throughout the several views of the drawings.

DETAILED DESCRIPTION

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

According to the principles of the present teachings, a miniature mechanical shutter assembly 10 for ultra-high vacuum (UHV) applications is provided that is, in some embodiments, confined to a space less than 2"×2"×5". It is unique in its design because of its ultra-high vacuum compatibility, simplicity, low cost of construction, and efficiency. In some embodiments, the miniature mechanical shutter assembly 10, having a shutter 11, can be used to block a stream of atoms (known as an atomic beam) during certain time periods of an experimental cycle. The shutter, including its size and housing, can be generalized to other vacuum applications.

In some embodiments, miniature mechanical shutter assembly 10 comprises a stainless steel tube 12 cut to the appropriate length, and the middle section 14 is compressed flat. On one half of this flat section 14, a hole or aperture 16 is drilled to allow an atomic beam to pass through, and the remaining flat section 14 blocks the beam. The stainless steel tube 12 and associated flat section 14 and aperture 16 together define shutter 11.

In some embodiments, three neodymium magnets control the motion and angle of the shutter 11. More particularly, in some embodiments, a first axial magnet 18 is disposed on a first end 20 of stainless steel tube 12 and a second diametrical magnet 22 is disposed on an opposing second end 24 of stainless steel tube 12. Additionally, an axial magnet 26 is disposed external to a housing 28. Diametrical magnet 22 fixes the angular orientation of the rod 12 in conjunction with a small axial magnet 26 external to the housing 12. The small magnet 26 is not powerful enough to affect the linear motion of the shutter 11. Axial magnet 18 in the other end 20 of the rod 12 controls the linear motion of the shutter 11, which will be described in the next section.

The shutter housing 28 is composed of two caps 32 attached to a commercial hexagonal vacuum chamber 30. The chamber 30 is used because of experimental constraints, but it also provides a convenient means of assembly. The hexagon chamber 30 can be replaced to fit other apparatuses or applications. The caps 32 are commercial 1.33" CF vacuum flange blanks that have a hole drilled at the center where a capped-off stainless steel tube is welded in. In the end of each cap 32, a Teflon disk 34 is wedged in to act as a soft stop for the shutter 11. Just inside the rim of each cap 32, a short section of glass tubing 36 is glued to serve as a minimal friction track on which the shutter operates.

On the outside of the cap that contains the axial magnet, there is a solenoid 40 (a coil of wire that current runs therethrough) made from Kapton coated wire. As a pulse of current is sent through the solenoid 40, a magnetic field is created. As a result, the axial magnet 18 is displaced, causing the shutter 11 to open or shut (depending on the direction of the current pulse and the orientation of the magnet). The solenoid 40 can be wound on an aluminum spool whose position can be adjusted on the cap 32. Current can flow through the solenoid 40 in both directions by means of an H-bridge circuit 42 that is widely available and easy to construct. The circuit 42 is connected to a constant power supply 44, and a TTL pulse from a computer or pulse generator sends a signal to the circuit 42 to switch the current through the solenoid 40 in the appropriate direction. The adjustable parameters of the constructed device are the location of the solenoid 40 in relation to the magnet 18, the current, the voltage, and the pulse durations.

For miniature mechanical shutter assembly 10 to work most efficiently, all of the above parameters can be optimized. There is a lower current and voltage threshold above which the shutter will work. These parameters were examined rigorously with the first version of miniature mechanical shutter assembly 10. It was found that in some embodiments, miniature mechanical shutter assembly 10 operates at about 8V and 5 A with current pulses of about 50 milliseconds with the intended duty cycle of once every 10 to 60 seconds (faster operation is possible but was not needed in our application). The pulse timing and duration was controlled by a pulse generator in conjunction with H-bridge circuit 42. Pulse durations were set to be long enough to ensure the efficiency of miniature mechanical shutter assembly 10, but can be set longer if desired. The power and duty cycle of miniature mechanical shutter assembly 10 are low enough that the heating, which is external to the vacuum chamber, is negligible.

Miniature mechanical shutter assembly 10 was tested both in atmosphere and under ultra-high vacuum (~$10^{-9}$ Torr) to determine a lower limit of its maintenance-free operating period and an estimate of its failure rate. A helium-neon (HeNe) laser simulated the atom beam through the aperture 16. A photo-detector measured the amount of light that passed through the aperture 16, which provided a signal for the motion of the shutter 11 across the beam. Miniature mechanical shutter assembly 10 was primarily tested with a period of 6 seconds, with equal timing between opening and closing. Periods of 1, 10, and 20 seconds were also tested. Consistently, miniature mechanical shutter assembly 10 opened/closed 10 to 15 milliseconds after the beginning of the electrical control pulse, with minimal variation between pulses. Additionally, the shutter moved from a completely open position to a completely closed position (and vice-versa) in about 2 milliseconds with a smooth transition. Nearly identical parameters held for both atmosphere and vacuum. To determine the lower limit of the maintenance-free operating period, miniature mechanical shutter assembly 10 was tested in periodic cycles of 6 seconds continuously for a few days to ensure that the parts did not fail, nor that the shutter 11 got stuck. To find the failure rate, over 3000 periods were sampled, and each individual pulse was examined for failures (incomplete or no movement). No failures were observed in either test.

The miniature mechanical shutter assembly of the present teachings is advantageous in that simple troubleshooting methods can be used in the event of a mechanical failure, such as the shutter rod 12 getting stuck. There are two straightforward methods to restore functionality if the shutter gets stuck. First, applying a long, high current pulse to the solenoid 40 will cause a greater force on the axial magnet 18, which would help dislodge the shutter 11. An alternative method is to take another magnet and bring it close to end 20 with the internal axial magnet to provide a similar force. In the event the shutter 11 gets misaligned, the external alignment magnet 26 can be adjusted to reorient the shutter 11 position. Additionally, if the shutter 11 needs to be removed from the experimental sequence but not the vacuum system (e.g. held in the open position), an exterior magnet can be fixed to the outside of end 20 to lock the shutter 11 in a well-defined location. Since all control elements for miniature mechanical shutter assembly 10, including the shutter drive circuit 42, are external to the vacuum chamber, problems with these components can be fixed without disassembly of the chamber.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A miniature mechanical shutter assembly comprising:
    a chamber;
    a tube member having an aperture formed therethrough, said tube member being mounted to the chamber in a manner that allows for translation and rotation;
    a pair of cap members disposed on opposing ends of said tube member, said pair of cap members supporting said tube member during said translation; and
    a plurality of magnet members, a first of the plurality of magnet members being disposed in a first end of said tube member, a second of the plurality of magnet members being disposed in a second end of said tube member opposite said first end, and a third of the plurality of magnets members being disposed external to said chamber, at least one of said plurality of magnet members being responsive to an electrical impulse to translate said tube member between an opened position and a closed position.

2. The miniature mechanical shutter according to claim 1 wherein said pair of cap members each comprises a glass liner between a respective one of said cap members and said tube member.

3. The miniature mechanical shutter according to claim 1 wherein said pair of cap members each comprises a Teflon member between a respective one of said cap members and said tube member.

4. The miniature mechanical shutter according to claim 1 wherein said plurality of magnet members are neodymium magnets.

5. The miniature mechanical shutter according to claim 1, further comprising:
    a drive circuit for exerting said electrical impulse upon said at least one of said plurality of magnet members.

6. The miniature mechanical shutter according to claim 5 wherein said drive circuit is an H-bridge circuit.

7. A miniature mechanical shutter assembly comprising:
    a chamber;
    a shutter member having an aperture formed therethrough, said shutter member being mounted to the chamber in a manner that allows for axial translation and axial rotation;
    a pair of cap members disposed on opposing ends of said shutter member, said pair of cap members supporting said shutter member during said axial translation and said axial rotation; and
    a plurality of magnet members, a first of the plurality of magnet members being disposed in a first end of said shutter member, a second of the plurality of magnet members being disposed in a second end of said shutter member opposite said first end, and a third of the plurality of magnets members being disposed external to said chamber, at least one of said plurality of magnet members being responsive to an electrical impulse to axially rotate said shutter member between an opened position and a closed position.

8. The miniature mechanical shutter according to claim 7 wherein said pair of cap members each comprises a glass liner between a respective one of said cap members and said shutter member.

9. The miniature mechanical shutter according to claim 7 wherein said pair of cap members each comprises a Teflon member between a respective one of said cap members and said shutter member.

10. The miniature mechanical shutter according to claim 7 wherein said plurality of magnet members are neodymium magnets.

11. The miniature mechanical shutter according to claim 7, further comprising:

a drive circuit for exerting said electrical impulse upon said at least one of said plurality of magnet members.

12. The miniature mechanical shutter according to claim 11 wherein said drive circuit is an H-bridge circuit.

\* \* \* \* \*